July 20, 1965   E. V. BLOOMQUIST ETAL   3,195,594
MATERIAL CUTTING MACHINE
Filed Jan. 9, 1963   2 Sheets-Sheet 1

INVENTORS
EVERT V. BLOOMQUIST
GERALD E. BLOOMQUIST
BY
Rudolph L. Lowell
ATTORNEYS

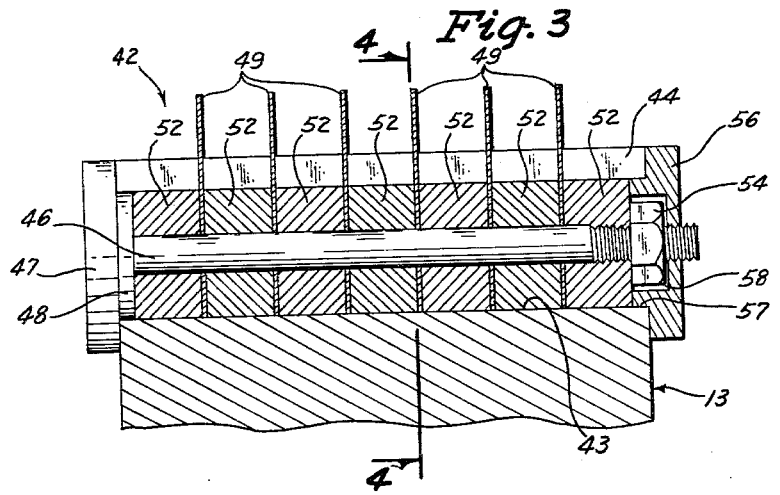
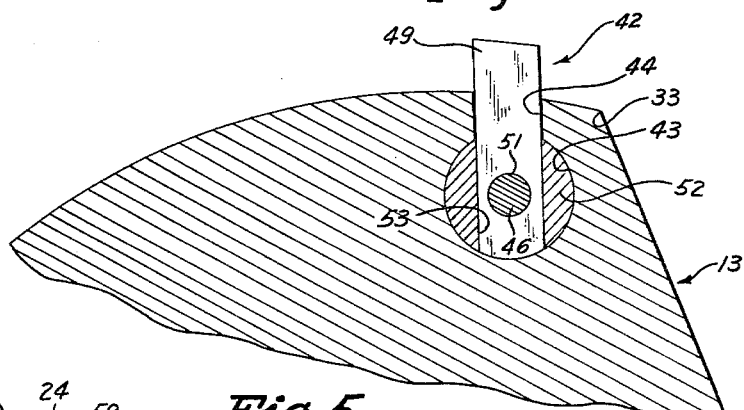
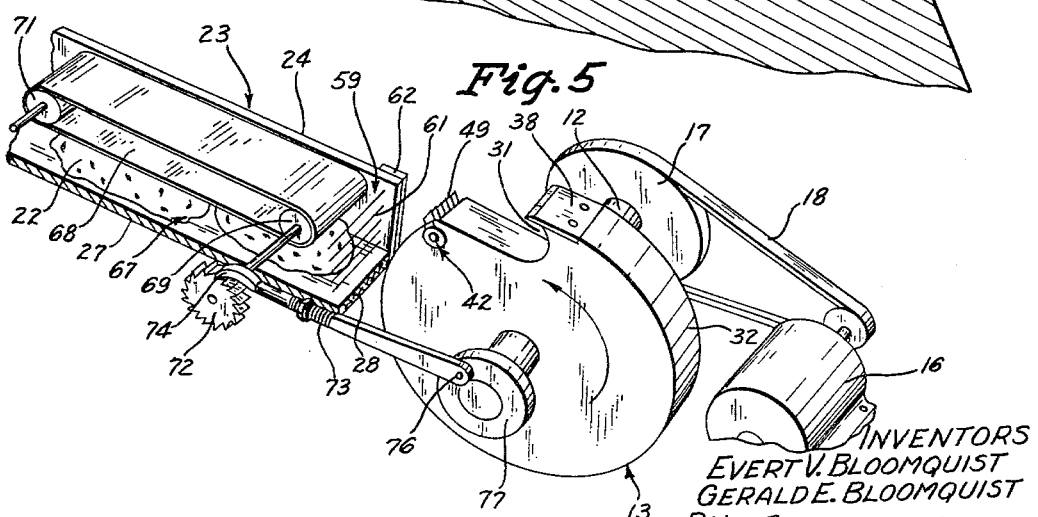

United States Patent Office 3,195,594
Patented July 20, 1965

3,195,594
MATERIAL CUTTING MACHINE
Evert V. Bloomquist and Gerald E. Bloomquist, both of P.O. Box 807, Wausau, Wis.
Filed Jan. 9, 1963, Ser. No. 250,407
7 Claims. (Cl. 146—78)

This invention relates to a method and machine for cutting material and more particularly to a machine having a rotary cutter head for slicing, stripping or cubing vegetables and the like.

It is the object of this invention to provide an improved for cutting solid food products or like material into slices, strips or cubes.

Another object of the invention is to provide an improved method of cutting solid food products or like material into slices, strips, or cubes.

A further object of the invention is to provide a cutting machine with a rotary cutter head for positively and accurately cutting solid materials into uniform sections.

Another object of the invention is to provide an improved method of cutting solid materials into slices, strips or cubes.

Still another object of the invention is to provide a machine for cutting food material which permits a change in the type and depth of cut and which can be readily disassembled for the purpose of permitting thorough and rapid cleansing.

A further object of the invention is to provide a material cutting machine with a material feeding mechanism which intermittently feeds material into a rotary cutter head in a timed relationship with the cutting means on the cutter head.

An additional object of the invention is to provide a cutting machine with a rotary cutter head formed with a cut receiving cavity adjacent and forward of the cutting edge of the material cutting means for receiving and collecting the cut material thereby assuring a uniform cut.

Another object of the invention is to provide a compact and economical material cutting machine which is simple and rugged in construction and reliable and efficient in use.

The exact nature of the invention as well as other objects and advantages thereof will be readily apparent from the consideration of the following specification relating to the annexed drawing in which:

FIG. 3 is an enlarged sectional view as seen along the line 3—3 of FIG. 2;

FIG. 4 is a sectional view taken along the line 4—4 in FIG. 3; and

FIG. 5 is a diagrammatic perspective view of the material cutting machine of the invention coupled with an intermittent material feeding mechanism.

Figure 1:
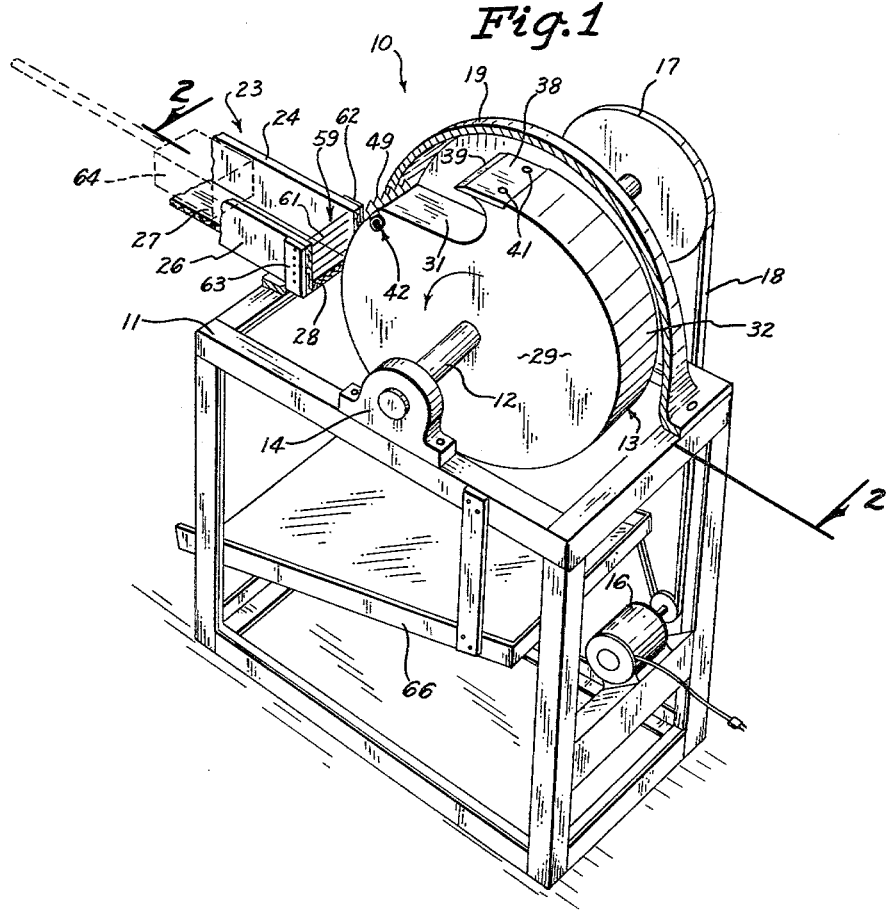
FIG. 1 is a perspective view of the material cutting machine of this invention with a portion of the outer casing being broken away to show part of the cutting mechanism in the interior thereof.

Referring to the drawing, there is shown in FIG. 1 the material cutting machine 10 of the invention. The machine 10 includes a frame 11 having an open and rectangular-shaped top. A shaft 12 carrying a rotor or cutter head 13 is rotatably mounted on top of the frame 11 by means of bearings 14. The rotor 13 is driven by an electric motor 16 which is drivably connected to the shaft 12 by a pulley 17 mounted on the shaft and a power transmission belt 18. The motor 16 is mounted on the frame 11 below the cutter head 13 and drives the cutter head 13 in a counterclockwise direction as seen in FIGURE 1.

Figure 2:
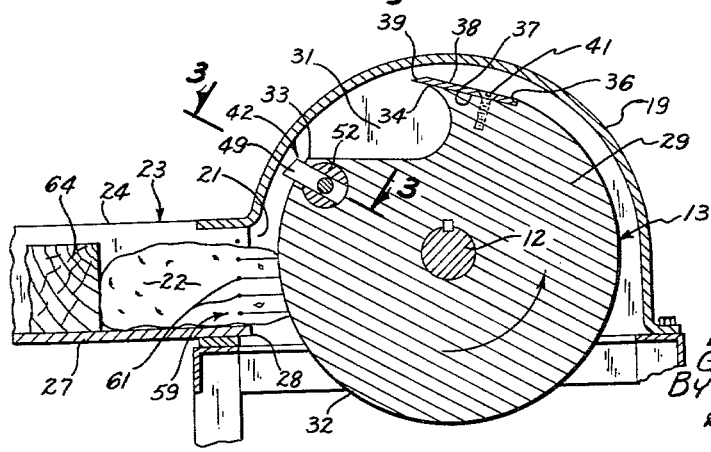
FIG. 2 is an enlarged sectional view taken substantially along the line 2—2 in FIG. 1 showing the assembled relation of the cutter head with the material hopper and the action of the cutter head on the material in the hopper.

A housing or casing 19 is secured to the top portion of the frame 11 and encloses the cutter head 13. The housing 19 has a hole 21 in its front wall adjacent the periphery of the cutter head 13 through which the material 22, such as a potato as shown in FIG. 2, is fed into the rotating cutter head 13. An elongated material feeding chute or hopper 23 having upwardly extending side walls 24 and 26 and a flat base plate 27 is secured to the housing 19 adjacent the hole 21 and provides a material receiving area which guides the material to be cut toward the rotating cutter head 13. The inner end 28 of the base plate 27 forms a stationary cutting edge which extends horizontally of the hole 21 and cooperates with the cutter head 13 in severing the material 22.

As shown in FIGS. 1 and 2, the cutter head 13 comprises a cylindrical shaped body member 29 having a material receiving slot or cavity 31 extended axially across the peripheral surface 32 thereof. The cavity 31 has a hook shape and a circumferential length and radial depth which is sufficient to receive the sections of material 22 that are severed by the cutter head 13. The leading axial section 33 of the body member 29 which defines the cavity 31 forms an obtuse angle with the peripheral surface 32 and the trailing axial section 34 forms an acute angle with the peripheral surface 32.

The peripheral surface 32 of the body member 29 adjacent the trailing axial section 34 is formed with an axial recess 36 having a flat surface 37 which extends in a tangential plane. A flat knife 38 having a continuous and axially extending cutting edge 39 is seated in the recess 36 and secured to the body member 29 by screws 41. The knife 38 extends forward of the trailing axial section 34 of the body member 29 and projects radially outward beyond the radial extent of the peripheral surface 32. The distance that the cutting edge 39 extends beyond the peripheral surface 32 determines the depth of cut that the cutter head takes on the material 22.

A knife assembly 42 is secured to the body member 29 forward of and adjacent the leading axial section 33 thereof. As shown in FIGURES 3 and 4, the cutter head 13 has an axial bore 43 extending through the body member 29 radially inwardly from the peripheral surface 32. A radial slit 44 opens the bore 43 to the peripheral surface 32. The slit 44 has a circumferential extent or width which is less than the diameter of the bore 43.

The knife assembly 42 shown in FIGS. 3 and 4 comprises a core bolt 46 having an enlarged head 47. The under side of the head 47 has a reduced diameter section 48 having dimensions substantially equal to the diameter of the bore 43. A plurality of radially extended knives 49 each containing a hole 51 are positioned on the bolt 46 and are axially spaced from each other by means of cylindrical spacer collars 52. Each spacer collar 52 has a diametrical groove 53 for receiving a flat knife 49. The depth of the groove 53 is slightly smaller than the thickness of the knife 49 thereby enabling the collars 52 to positively hold the blades 49. The diameter of the collars 52 is substantially equal to the diameter of the bore 43. The knives 49 and spacers 52 are held in assembled relationship by a nut 54 threaded on the end of the bolt 46. The spacing between adjacent knives and the number of knives in the knife assembly 42 may be changed by using collars of different widths.

The knife assembly 42 is inserted axially into the bore 43 with the knives 49 extending through the slit 44 and in engagement with the axial sides thereof. The knife assembly 42 is held in the assembled position on the body member 29 by means of a stepped nut 56 which threadably engages the end of the bolt 46 to limit the axial movement of the knife assembly 42 in the bore 43. The nut 56 has a reduced diameter portion 57 which is substantially equal to the diameter of the bore 43 and a central cavity 58 for receiving the nut 54.

In use, the knife assembly 42 can be removed from the cutter head 13 by removing the step nut 56 and axially withdrawing the knives 49 and collars 52 as a unit out of the bore 43.

As shown in FIGS. 1 and 2, a horizontal material cutting assembly 59 extends between the side walls 24 and 26 of the feeding chute 23 adjacent the hole 21 in the housing 19. The cutting assembly 59 comprises a plurality of vertically spaced and horizontally extended cutting members 61, such as wires or blades, which are held in assembled relation with the chute 23 by fastening blocks 62 and 63. The number of cutting members 61 may be varied or removed by releasing the respective cutting members from the fastening blocks.

The machine 10 is operated by connecting the electric motor 16 to a source of electrical power. The motor drives the cutter head 13 in a direction indicated by the arrow in FIGS. 1 and 2. When the cutter head 13 is rotating the radial knives 49 of the knife assembly 42 and the knife edge 39 of the knife 38 are sequentially moved past the stationary edge 28 of the base plate 27.

The material 22 to be cut is placed in the hopper or feeding chute 23 and is forced toward the cutter head 13 by a manually operated plunger 64. As shown in FIG. 2, the plunger 64 moves the material 22 past the horizontal cutting members 61 to cut the material into horizontal sheets or layers. Subsequently the cut material 22 engages the smooth peripheral surface 32 of the cutter head 13 forward of the knife assembly 42. In this position the axially spaced knives 49 cut the material 22 in a vertical direction to provide the end of the material 22 with a checkerboard cut pattern. The knife 38 severs the material 22 in a third dimension thereby forming cubes. After the material 22 has been severed from the main body thereof the severed pieces of material move radially inward into the material receiving slot or cavity 31 where they are carried circumferentially for discharge into a receiving pan 66 secured to the frame 11 below the cutter head 13.

When the cutting members 61 are removed the material 22 is initially cut into vertical strips by the axially spaced radial knives 49. When the knife 38 severs the strips from the body of the material 22, shoestring-like strips are formed.

A flat chip or peel having a grooved surface may be cut from the material 22 by reducing the radial length of the knives 49 so that the knife 38 has a deeper cut than the knives 49. A smooth chip may be obtained by removing the knife assembly 42 from the cutter head 13 thereby cutting the material 22 with only the knife 38. The dimensions of the various cuts may be varied by changing the number and spacing of the axially spaced radial knives 49 and the horizontal cutting members 61 and the depth of the cut of the knife 38.

In order to increase the cutting capacity of the machine, the cutter head 13 may be formed with a plurality of circumferentially spaced axial cavities 31 and associated axial knife members 38 and radial knife assemblies 42. By removing selected radial knife assemblies 42 cut material of different shapes may be intermixed.

Referring to FIG. 5 the cutter head 13 and feeding chute 23 are shown diagrammatically in combination with an intermittently material feed mechanism 67 which directs material to be cut down the feeding chute 23 into engagement with the cutter head 13. Feeding mechanism 67 comprises an endless belt 68 extended over a pair of spaced rollers 69 and 71 which are rotatably mounted in the side walls 24 and 26 of the feeding chute 23. The belt 68 is spaced above the base plate 27 and is adapted to engage the material 22 forcing it along the base plate 27 toward the cutter head 13. In order to intermittently drive the belt 68, a ratchet wheel 72 is connected to the roller 69. A ratchet arm 73 having a pawl at one end thereof is in engagement with the ratchet wheel 72. The other end of the arm 73 is pivoted to a crank pin 76 which is secured to a disc 77 mounted on the cutter head shaft 12.

In operation the motor 16 drives the cutter head 13 in a counterclockwise direction as is indicated by the arrow in FIG. 5 to move the knives 49 and 38 sequentially past the stationary edge 28 of the feeding chute 23. The crank pin 76 revolves about the axis of the shaft 12 to reciprocate the ratchet arm 73 and provide the pawl 74 with a power and retraction stroke. The pin 76 is secured to the disc 77 in an angular relationship with respect to the cutting knives 49 and 38 such that the material is fed toward the portion of the peripheral surface 32 which extends immediately forward from the cavity 31. The material is not fed toward the surface 32 during the cutting action of the knife 38 thereby permitting the knife 38 to make a uniform cut. The belt 68 is moved by the ratchet wheel 72 and drive pawl 74 in a timed relationship with respect to the cutting knives 49 and 38. The material is moved into engagement with the peripheral surface 32 immediately forward of the knives 49 as the knives approach the material to be cut.

While there have been shown, described, and pointed out the fundamental novel features of the invention, it will be understood that various omissions, substitutions, changes in form, and details of the machine illustrated may be made by those skilled in the art, without departing from the spirit of the invention. It is intended to be limited only as indicated by the scope of the following claims.

We claim:
1. A machine for cutting solid material comprising:
 (a) a frame,
 (b) a body member rotatably mounted on said frame, said body member having a circular-shaped peripheral surface with at least one axially extended cavity defining a leading and trailing edge,
 (c) first knife means secured to and extended substantially tangential to the peripheral surface of said body member, said first knife means having a cutting edge extended axially of and circumferentially forward from the trailing edge of said cavity thereby positioning the cutting edge radially of said cavity,
 (d) second knife means secured to said body member adjacent and forward of the leading edge of said cavity, said second knife means having at least one cutting member extended circumferentially of and radially outwardly from said body member,
 (e) guide means secured to said frame for directing the material to be cut into engagement with the peripheral surface of said body member, and
 (f) cutting means positioned in said guide means for severing the material substantially normal to the direction of rotation of said cutter head.

2. A machine for cutting material comprising:
 (a) a frame,
 (b) a cutter head rotatably supported on said frame,
 (c) first knife means secured to said cutter head and extended axially of said cutter head,
 (d) second knife means secured to said cutter head forward of said first knife means, said second knife means having at least one cutting edge extended circumferentially of said cutter head,
 (e) said cutter head being formed with an axially extended cavity in front of said first knife means, said cavity being of a size such that the material cut by said first knife means, during a single cutting engagement thereof with the material, is received in said cavity for discharge from the cavity following said engagement,
 (f) guide means for directing the material to be cut into engagement with said cutter head,
 (g) cutting means positioned in said guide means for slicing the material substantially normal to the direction of rotation of said cutter head, and
(h) material feeding means for intermittently forcing the material through said cutting means into engagement with said cutter head, said feeding means being synchronized with the rotating cutter head to feed the material to engage the portion of the cutter head which extends forward of the cavity.

3. A cutter head for a material cutting machine comprising:
(a) a cylindrical body member adapted to be mounted for rotation about the longitudinal axis thereof, said body member having a circular-shaped outer peripheral surface with at least one axially extended cavity, in the outer peripheral surface thereof,
(b) first knife means secured to and extended substantially tangential to the peripheral surface of said body member rearward of the trailing edge of said cavity and having a cutting edge extended axially of and circumferentially forward from the trailing edge of said cavity thereby positioning the cutting edge radially of said cavity,
(c) second knife means secured to said body member forward of and adjacent leading edge of said cavity, said second knife means having at least one cutting member extended radially outwardly from said body member, and
(d) said cavity being of a hook-shape transversely of said body member with an arcuate portion extended circumferentially rearward and radially inward of said trailing edge whereby material severed by said cutting edge is moved along said arcuate portion for discharge from the cutting head.

4. A cutter head for a material cutting machine comprising:
(a) a cylindrical body member adapted to be mounted for rotation about the longitudinal axis thereof, said body member having a circular-shaped outer peripheral surface with at least one axially extended cavity in the outer peripheral surface thereof defining a leading and trailing edge,
(b) knife means secured to and extended substantially tangential to the peripheral surface of said body member rearward of and adjacent the trailing edge of said cavity, said knife means having a cutting edge extended axially of the body member and circumferentially forward from the trailing edge of said cavity thereby positioning the cutting edge radially of said cavity, and
(c) said cavity being of a hook-shape having an arcuate portion extending radially inward from rearwardly of the trailing edge whereby to direct cut material prior to being discharged from the cutting head.

5. A rotatable cutter head for a material cutting machine comprising:
(a) a cylindrical body member adapted to be mounted for rotation about the longitudinal axis thereof, said body member having a peripheral surface and at least one axial bore having a portion of the side wall thereof open to said surface, said opening having a circumferential length less than the circumferential length of the bore,
(b) a knife assembly having a shape complementary to said bore and positioned therein, said knife assembly including at least one cutting blade extended through said opening and outwardly from said surface, and
(c) means for securing said knife assembly in assembled relation with said body member.

6. Cutter means for a material cutting machine comprising:
(a) a body member having an outer peripheral surface and at least one bore having a portion of the side wall thereof open to said surface, said opening having a width less than the width of said bore,
(b) a knife assembly having a shape complementary to said bore and positioned therein, said knife assembly including at least one cutting blade extended through said opening and outwardly from said surface, and
(c) means for securing said knife assembly in assembled relation with said body member, 7. A method of cutting material into uniform sections with a rotary cutter head having axially extended cutting means and radially extended cutting means circumferentially separated by an axially extended cavity in front of said axial cutting means comprising the steps of
(a) intermittently moving the material into engagement with the portion of the rotary cutter head forward of said cavity,
(b) slicing one end portion of the material during the intermittent movement thereof toward the cutter head,
(c) grooving the sliced material with the radial cutting means of the rotating cutter head in a direction substantially normal to the slice plane, and
(d) severing the sliced and grooved material with the axial cutting means of the rotating cutter head.

References Cited by the Examiner

UNITED STATES PATENTS

| | | | |
|---|---|---|---|
| 546,565 | 9/95 | Turner | 146—119 |
| 1,840,893 | 1/32 | Giddings | 146—118 |
| 1,865,986 | 7/32 | White. | |
| 1,936,180 | 11/33 | Trainor et al. | 146—78 |
| 2,449,605 | 9/48 | Kelton. | |
| 2,997,082 | 8/61 | Schubert et al. | 144—162 X |
| 3,037,540 | 6/62 | Bloomquist et al. | 146—123 |
| 3,091,269 | 5/63 | Burns et al. | |

FOREIGN PATENTS 190,596 7/37 Switzerland.

J. SPENCER OVERHOLSER, *Primary Examiner.*